United States Patent [19]

Sirmans

[11] 4,446,768
[45] May 8, 1984

[54] GLASS CUTTER DEVICE

[76] Inventor: John J. Sirmans, 300 Allen St., Walbridge, Ohio 43465

[21] Appl. No.: 262,549

[22] Filed: May 11, 1981

[51] Int. Cl.³ .......................... C03B 33/04; B26D 3/08
[52] U.S. Cl. .......................................... 83/879; 33/26; 33/27 C; 83/574
[58] Field of Search ................ 83/886, 879, 880, 574; 33/26, 270, 27 R

[56] References Cited

U.S. PATENT DOCUMENTS

| | | | |
|---|---|---|---|
| 100,072 | 2/1870 | Ritchie | 33/26 |
| 650,856 | 6/1900 | Moyer | 33/26 |
| 2,548,302 | 4/1951 | Gilson | 33/26 |
| 3,241,240 | 3/1966 | Boehm | 33/26 |
| 4,120,220 | 10/1978 | Mullen | 83/886 |

Primary Examiner—Frank T. Yost
Attorney, Agent, or Firm—George R. Royer

[57] ABSTRACT

A device for facilitating the cutting of glass into a plurality of similarly sized shapes, such device comprising a frame member having a longitudinally extending base member which is pivotally mounted on a relatively flat working surface; and affixed at the end of the longitudinally extending base member, which is opposite to the end which is pivotally mounted, is a longitudinally extending connecting bar, disposed generally perpendicular to the base member. Moreover, the upper part of the connecting bar member is affixed to a longitudinal slide member, with the connecting bar and the slide member all lying in the same horizontal plane which is disposed parallel and adjacent the working surface. Integrally affixed into the working surface is a depressed arcuate guide, such arc guide being adapted to receive in sliding fashion therein a portion of the bottom of the slide member. A cutting tool holder is slidably mounted on the connecting bar member, such holder being adapted to hold a glass cutting tool, which depends downwardly to facilitate the cutting of glass plate disposed horizontally on the working surface.

1 Claim, 5 Drawing Figures

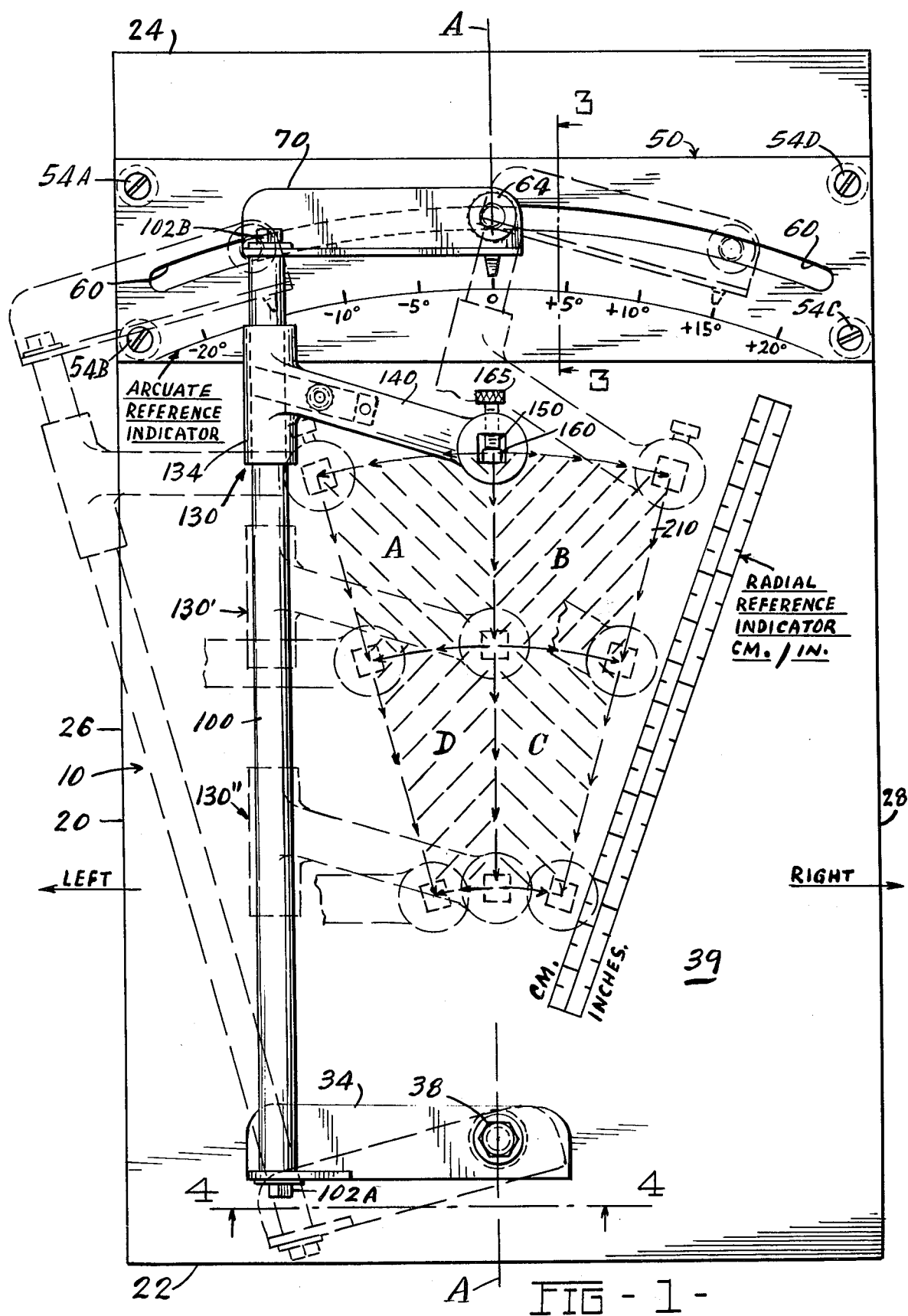

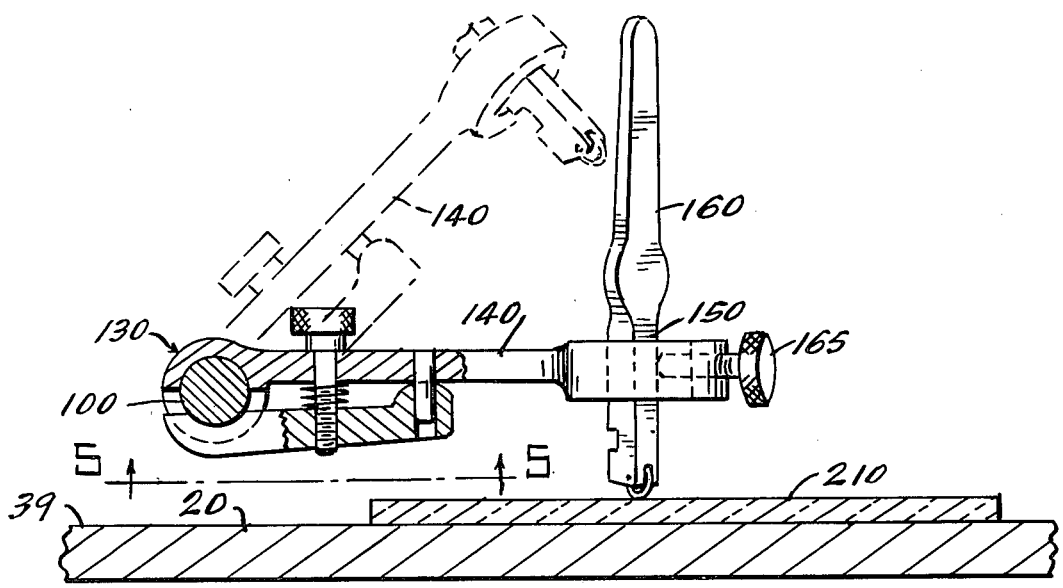
FIG-2-
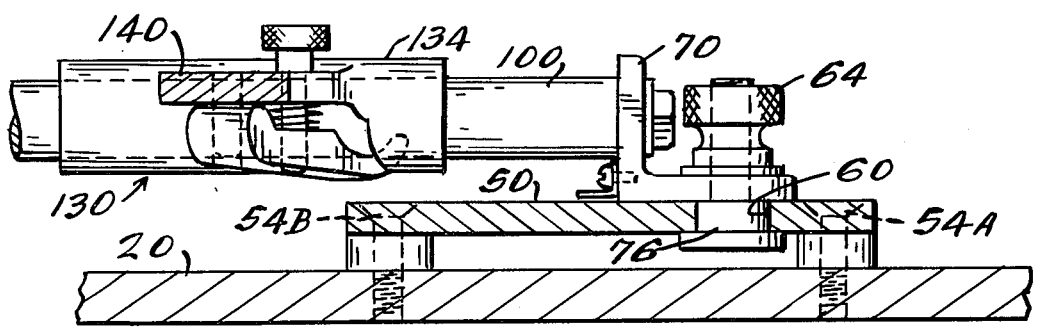
FIG-3-
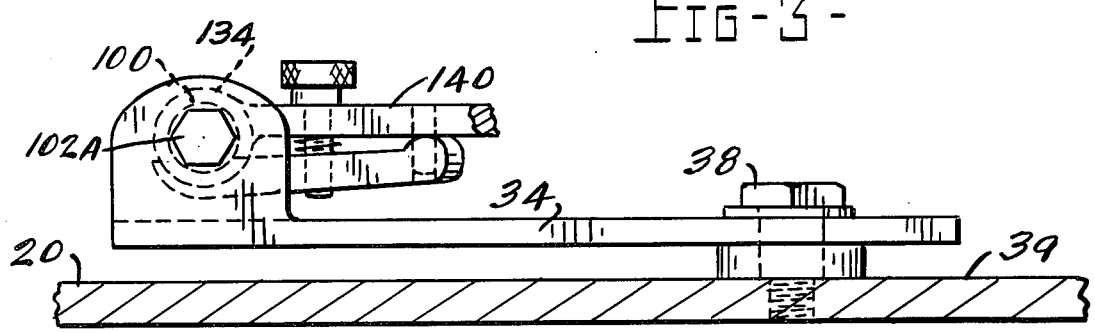
FIG-4-
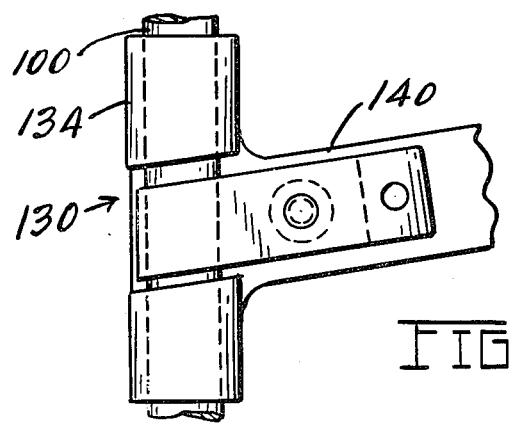
FIG-5-

GLASS CUTTER DEVICE

DISCUSSION OF PRIOR ART

This invention relates to the art of cutting glass particularly for decorative purposes. More specifically, the invention herein relates to a device which facilitates the cutting of plate glass into a plurality of pieces of generally symmetrical or similar patterns over successfully repeated cutting procedures. In this latter process of cutting plate glass, it is vital that the pieces be of precisely identical size and configuration for the subsequent interconnection of these pieces into a final product which comprises such interconnected glass pieces. It is thus important to have a cutting frame mechanism which helps to facilitate this process of cutting the glass into the desired identical shapes.

In this latter regard, there are several known devices used to facilitate the process of cutting glass into similar patterns of identical size. Some of the devices used are able to a limited degree to effectively help permit successive similar linear cuts, however, few such devices are effective for accurately and effectively facilitating the repeated cuts of patterns involving fairly intricate linear and nonlinear patterns. However, these known devices are of such a nature that they are generally too cumbersome to effectively cut glass pieces into similar sized shapes with to desired linear and nonlinear cuts. There are thus no known devices which effectively permit the cutting of glass into similar symmetrical patterns. Consequently, there is a need for such a device in the area of decorative glass cutting processes. This invention relates to such end, and the following objects are directed accordingly.

OBJECTS

The following are objects of the subject invention.

It is an object of the subject invention to provide an improved device for helping the process of cutting glass into intricate shapes of similar size;

Another object of the subject invention is to provide an efficient device for facilitating the cutting of glass shapes of a similar pattern and shape;

Still another object is to provide an improved device to help cut glass with linear and nonlinear cuts;

It is also an object of the subject invention to provide an improved device for aiding the process of cutting glass into pieces of identical shape and size;

Another object is to provide an improved glass cutting device;

Other objects of the subject invention will become evident from the following description taken in conjunction with the drawings.

DRAWINGS

In the drawings, the following views are set forth:

FIG. 1 is a top planar view of the subject device;

FIG. 2 is a side elevational view of the cutting tool holder;

FIG. 3 is a side elevational view of the arc guide frame, shown in sections;

FIG. 4 is a side elevational view of the arc guide holder shown partially in sections;

FIG. 5 is a top elevational view of the slide mechanism for the cutting tool holder.

DESCRIPTION OF GENERAL EMBODIMENT AND SUMMARY INVENTION

The subject invention is a device for facilitating the cutting of plate glass for purposes of creating successive, identical cuts of glass. The apparatus comprises a generally rectangular disposed frame member, one part of which is pivotally mounted on a base working member upon which is also disposed the plate glass to be cut. Slidably mounted on a portion of the frame is a downwardly depending tool holder, which holds the cutting tool used to make the successive glass cuts desired.

DESCRIPTION OF PREFERRED EMBODIMENT

Referring now to the drawings in which a preferred embodiment is shown. In describing the subject invention, it must be noted that while a preferred embodiment is shown, the following description of such a preferred embodiment shall not be considered as limiting the scope of the following claims, and that other embodiments fall within the scope of the subject invention.

Referring now to the drawings in which a preferred embodiment is shown, in FIG. 1, a top elevational view of the subject cutting apparatus 10 is shown. In this indicated embodiment, the cutting apparatus 10 is positioned generally horizontally and integrally affixed on a flat board 20 of generally rectangular shape. It must be noted that this latter configuration of the board 20 is not critical to the subject invention. The board 20 serves as the working surface on which the glass is placed in a flat horizontal position flush with the top board surface and is cut by the intercooperation of apparatus 10.

Further description of the subject invention will be facilitated by the following reference nomenclature. First, in reference to the positioning of the apparatus 10 and the board 20, as shown in the top planar view of FIG. 1, edge 22 of the board 20 will be referred to as the lower edge, while opposite edge 24 will be referred to as the "upper" edge. In this respect, in the use of the apparatus 10 on board 20, the lower edge is adjacent the user as the apparatus 10 is designated 22 for such orientation usage. Moreover, the edge 26 of board 10 will be hereinafter referred to as the "left side", and the edge 28 will be referred to as the "right side". These orientations are set forth in the drawings and the description of the cutting apparatus 10 on the board 20 will be thus referred accordingly to the comparably upper, lower, left, and right positions so designated. Finally, the "top" surface of the board will refer to the board working surface.

Referring now to FIG. 1, the subject apparatus 10 is shown in the position in which it is disposed on the surface of board 20 between the lower edge 22 and upper edge 24 and between the right edge 26 and left edge 28, as shown. In particular, the lower base member 34 of the subject apparatus 10 is a longitudinally extending member which is pivotally mounted near the bottom edge 22 of the board 20, approximately in the middle between left edge 26 and right edge 28. More specifically, the right end of the lower base member 34 is pivotally mounted for free rotation on pivot pin 38, which is, in turn, integrally affixed in the top surface 39 of board 20, as shown. By virtue of the latter construction, the lower base member 34 is free to move clockwise or counterclockwise about pin 38, within constraint limits imposed by the constructional disposition of the remainder of apparatus 10.

Integrally affixed into the top surface of the board 20, near edge 24 is a rectangularly shaped guide plate 50, secured into such top surface 30, by a plurality of screws 54A, 54B, 54C and 54D. As shown, such guide plate 50 extends from the left edge 26 of board 20 to the right edge and near the upper edge 24, as shown. Machined within the upper surface of guide plate 50 is a depressed arcuate slot 60, shown as being concave from the position of the worker near the lower edge 22 of the board. The arcuate slot has a graduated scale extending on both the left and right side as shown in FIG. 1 to indicate the positional movement in the arcuate slot 60.

As can be observed by a review of FIG. 1, the middle 64 of arcuate slot 60 is aligned along a straight vertical axis A—A which extends up the middle of board 20 dividing the left and right portions of such board into equal symmetrical portions. Additionally, the vertical axis A—A, as shown in FIG. 1, divides the arcuate slot 60 into equal left and right portions, as also can be observed from the above indicates scalar divisions located just below such slot. This latter symmetry is desirable in constructing the preferred embodiment.

Adapted for slidable movement in the depressed slot 60 is a lower extending portion of slide bar member 70, which slide bar member is generally a longitudinally extending rectangular member, as shown. In particular, depending downwardly from the undersurface of such sliding bar member is a vertical tong 76 which fits into a portion of the slot 60 and engages same so as to be movable back and forth in all positions of such slot. As shown in the drawings, particularly, FIG. 1, depending tong 76 is integrally affixed adjacent the right end of the slide bar member 70, as shown.

Joining the respective left ends each of the slide bar member 70 and the base member 34 is longitudinally extending connecting bar 100, such bar being preferably of a cylindrical construction. Specifically, the connecting bar 100 is joined by bolts 102A and 102B respectively on the lower and upper ends thereof to base member 34 and slide bar member 70, as shown in the drawings. As joined, base member 34, sliding bar member 70 and connecting bar member 100 all jointly serve as a unified working piece constituting the main element of apparatus 10. Moreover, the vertical axis AA is aligned parallel to bar member 100 when the depending tong 76 is disposed in the middle of the slot 60, in the position shown in the drawings. Therefore, as can be seen the resultant joinder of base members 34 and slide bar member 70 with bar 100 forms a movable frame, pivoted at point 38 and slidable back and forth from left to right within the constraints of slot 60. For example, in FIG. 1, the position of frame 10 shown in phantom represents one position in a movement to the left in slot 60.

Slidably mounted on connecting bar member 100 is a slidable sleeve member 130 encircling such bar member 100 such that it is capable of sliding up and down on the connecting bar 100 as desired. The sleeve 130 is generally comprised of a cylindrically shaped hollow member 134, slidably mounted on cylindrical connecting bar 100, with an integral extension arm 140 projecting therefrom in a direction towards the center of the board 20, as shown. Such latter extension arm 140 is a partially hollow member with a holding clamp 150 adapted to receive and hold therein in a downwardly depending position a glass cutting tool 160, as shown in FIG. 2. The extension arm 140 can be constructed as a retractible member to positions shown in phantom in FIG. 2. A locking member 165 on arm 140 serves to lock the cutting tool into position, as desired.

It is to be indicated that in the preferred embodiment of the subject invention, the tong 76, on sliding plate 70, with the pivot pin 38 and center of tool clamp 150 form a straight line and this line is coextensive or aligned with the axis A—A whenever the tong 76 is in the middle of slot 60 in the position shown in FIG. 1. By this latter constructional arrangement, the cutting tool 160 will always cut on the same straight line along an axis which is aligned between pivot point 38 and tong 76, no matter what piece of glass is placed under the working tool 160. Therefore, assurance is had that all linear cuts will be the same for purposes of assuring all cut pieces will be of the same size and shape. In similar fashion, the cutting tool 160 can be adjusted in arm 130 so as to facilitate similar arcuate cuts in the process by moving apparatus 10 left or right. Examples of such, linear and nonlinear cuts and D shown in FIG. 1 for glass piece 210.

While a preferred embodiment is shown and described, it shall not be considered as limting the scope of the subject claims.

I claim:

1. A device for facilitating the cutting of glass into similar shapes and sizes comprising:
    (a) a base member having an upper surface;
    (b) a member having an arcuately shaped slot affixed to the upper surface of the base member;
    (c) a first longitudinally extending member having a first end and a second end, said first end being pivotally mounted to the upper surface of one portion of said base member;
    (d) a second longitudinally extending member having a first end and a second end, with a portion of said second longitudinally extending member being engaged for free sliding movement in the arcuate slot;
    (e) a third longitudinally extending member rigidly connecting said first and second longitudinally extending members;
    (f) slidable means on the third longitudinally extending member for holding a tool therein for cutting purposes.

* * * * *